United States Patent Office 3,530,112
Patented Sept. 22, 1970

3,530,112
PROCESS FOR PREPARING DISPERSANTS USEFUL IN HYDRAULIC CEMENT SLURRIES
John Charles Steinberg and Kenneth Russell Gray, Shelton, Wash., assignors to ITT Rayonier Incorporated, a corporation of Delaware
No Drawing. Continuation-in-part of application Ser. No. 366,920, May 12, 1964. This application July 24, 1967, Ser. No. 655,299
Int. Cl. C08b 19/00
U.S. Cl. 260—209        3 Claims

ABSTRACT OF THE DISCLOSURE

A dispersant, effective as a dispersant in hydraulic cement slurries, is prepared by reacting (a) a concentrated hydrolyzate containing predominantly short-chain polymers of the non-cellulose carbohydrate constituents resulting from the partial hydrolysis of coniferous wood, with (b) a water-soluble salt of sulfurous acid. The amount of such water-soluble salt is equivalent to 0.10 to 0.25 part of $SO_2$ per parts solids in the hydrolyzate. The reaction is carried out at a temperature of 160°–180° C. until the resulting reaction product is substantially free of sugars.

CROSS-REFERENCES TO RELATED APPLICATIONS

This application is a continuation-in-part of application Ser. No. 366,920, filed May 12, 1964, now U.S. Patent No. 3,332,791, issued July 25, 1967.

BACKGROUND OF THE INVENTION

It has been suggested in many publications relating to cement products that various types of carbohydrates such as reducing sugars, partially hydrolyzed starches, and the like, be used to disperse, render more workable and retard the setting time of slurries of hydraulic cement. Such compounds are known to be effective retardants. None, however, has proven itself practical in general use. The retarding effect of such carbohydrates on cement slurries is so great that any quantity of said carbohydrate that is effective as a dispersant and water-reducing agent also retards the setting time beyond permissible limits. As a result, rather than being considered useful in cement slurries they are usually considered to be harmful and are carefully removed where they occur in combination with other types of dispersants such as spent sulfite liquor solids.

The terms "cement slurry" and "cement dispersion" are used herein interchangeably. Both terms are intended to include aqueous slurries of hydraulic cement by itself, mixtures of hydraulic cement and sand (mortars) and mixtures of hydraulic cement, sand and gravel (concretes).

SUMMARY OF THE INVENTION

Partially hydrolyzed conifer wood hemicelluloses comprising water soluble, largely short-chain polymers, derived from mannose and glucose with relatively stable linkages, may be converted into nonretarding admixtures for concrete (i.e., causing 1.0 hour or less retardation of setting time) by reacting said partial hydrolyzate with soluble salts of sulfurous acids using sufficient chemical and high enough temperature to break down the polymeric substance as evidenced by substantial or complete freedom from free and/or combined sugars determinable by paper chromatography. Suitable reaction conditions comprise digestion with $Na_2SO_3$, $NaHSO_3$, $(NH_4)_2SO_3$, $(NH_4)HSO_3$, and mixtures thereof in amounts corresponding to 10 to 25 percent $SO_2$, based on hydrolyzate solids, at a temperature of 160–180° C., until the reaction product is substantially free of sugars. Prior to such digestion, the hydrolyzate produced by partial hydrolysis of conifer wood with steam or water is first concentrated by evaporation to concentrations of 40–70 percent solids. The dispersant is preferably added to the cement slurry in an amount varying from 0.10 to 0.30 percent by weight, on a dry basis, based on the weight of the cement.

In most cases a digestion time of about 30–50 minutes will suffice to bring about the desired substantial conversion of sugar units to nonsugar products. However, for any of the chemical and temperature conditions given herein the required reaction time can readily be ascertained by measuring the disappearance of total carbohydrate, said total carbohydrate being measured by chromatographic determination of monosaccharides following acid hydrolysis using the method described by J. E. Jeffery, E. V. Partlow, W. J. Polglase, Anal. Chem. 32, 1774 (1960).

DESCRIPTION OF THE PREFERRED EMBODIMENTS

Example 1

Wood chips of mixed southern yellow pines were treated with direct steam for 45 minutes at 170° C. and the condensate containing partially hydrolyzed hemicelluloses was drained from the digester. This liquor was concentrated under vacuum to 65 percent solids. Analysis of this concentrate by paper chromatography showed 41.9 percent combined sugars and 17.8 percent free sugars, on a dry basis. Portions of the concentrate were digested with solutions of soluble salts of sulfurous acid to yield products of low sugar content and having solids concentrations of 40–50 percent.

| Product | Digestion chemical Name | Amount, pct. of solids in concentrated hydrolyzate | Max. Temp., °C. | Time at Max. Temp., min. | Sugar pct. (dry basis) Combined | Free |
|---|---|---|---|---|---|---|
| A | $Na_2SO_3$ | 10.0 | 165 | 30 | 14.7 | 0.0 |
| B | $(NH_4)_2SO_3$ / $(NH_4)HSO_3$ | 7.5 / 7.5 | 165 | 40 | 0.9 | 7.7 |
| C | $(NH_4)_2SO_3$ | 15.0 | 165 | 40 | 6.5 | 4.1 |
| D | $(NH_4)_2SO_3$ / $(NH_4)HSO_3$ | 10.0 / 10.0 | 165 | 50 | 0.1 | 2.0 |
| E | $(NH_4)_2SO_3$ | 20.0 | 165 | 50 | 6.4 | 1.2 |

Example 2

This example shows that the digestion conditions of Example 1 result in products which are classed as nonretarding chemical admixtures for concrete (i.e., admixtures retarding the setting time one hour or less), whereas the undigested material is a retarding admixture.

Concrete test samples were prepared with and without the addition of products A through E of Example 1. In addition, a comparative test sample was prepared containing the same amount of undigested starting material (F) from which products A through E were prepared. The method of preparing and testing the concrete samples was as described in Example 8 of the copending application Ser. No. 366,920.

| Product No.: | Dosage, pct. of cement, dry basis | Retardation of final concrete set, hour |
|---|---|---|
| None | 0.00 | 0.0 |
| A | 0.20 | 0.6 |
| B | 0.20 | 0.5 |
| C | 0.20 | 0.7 |
| D | 0.20 | 0.4 |
| E | 0.20 | 0.4 |
| F[1] | 0.20 | 2.5 |

[1] Partially hydrolyzed hemicelluloses from which Products A through E were prepared.

Example 3

A sample of a steam prehydrolysis condensate from the digestion of wood chips was obtained. It had a total solids content of 42.7 percent of which 71.6 percent was water soluble carbohydrate material composed of oligosaccharides and free sugars having the following analysis on a hydrolyzed basis: 9.6 percent galactose, 13.7 percent glucose, 36.6 percent mannose, 2.7 percent arabinose and 9.0 percent xylose on a dry weight basis. To 3240 grams of this condensate solution was added 152 grams of $Na_2SO_3$ with a moisture content of 10 percent and 107 grams of $Na_2S_2O_5$ with a moisture content of 4.0 percent. The resultant solution had a total solids content of 46.4 percent, a pH of 7.3 and a viscosity of 30 centipoises at 25° C. It was placed in a closed digester and raised to a temperature of 160° C. in 9 minutes and digested at that temperature for 15 minutes. On cooling to room temperature it had a total solids content of 43.6 percent, a pH of 4.3 and a viscosity of 14 centipoises at 25° C. It was then neutralized with NaOH to pH 9.0 and a small amount of fungicide added. Analysis showed that 43.8 percent of the original carbohydrate material, including all of the free sugars had been converted to complex conversion products. This solution was found to be highly satisfactory as a dispersant in hydraulic cement slurries.

The agents of the invention are useful as Type A admixtures (i.e., the ASTM classification of water-reducing chemical admixtures for concrete). When added to concrete at dosages comparable to those at which other admixtures are frequently used (e.g., 20% on a dry basis, based on cement) they will, without use of auxiliary accelerating agents, not retard the setting time of concrete more than permitted by the ASTM specification for Type A admixtures (not over one hour). Under comparable conditions, however, carbohydrate or carbohydrate derivatives in general retard to an extent where they would (1) be classified by the ASTM as Type D (i.e, water reducing and retarding) admixtures or (2) retard in excess of Type D specifications and hence be impractical for use.

The agents of the invention are also useful for the complexing or chelation of metals, particularly in alkaline solutions. In this regard, metals (e.g., iron, zinc, manganese) which form insoluble hydroxides may be added in salt form (e.g., as sulfates) to the products of the invention and upon subsequent alkalization remain soluble because of chelation or complexing. Furthermore, salts such as ferrous sulfate, zinc sulfate or manganous sulfate may be added to products of the invention to form solutions of metal complexes which are useful in agriculture as foliar sprays for correction of mineral deficiencies in plants including fruit trees, garden and field crops and ornamentals.

We claim:

1. The process for preparing a dispersant which comprises reacting a concentrated hydrolyzate containing predominantly short-chain polymers of the noncellulose carbohydrate constituents resulting from the partial hydrolysis of coniferous wood, with a water-soluble salt of sulfurous acid in an amount equivalent to 0.10 to 0.25 part of $SO_2$ per part solids in the hydrolyzate at a temperature of 160–180° C. until the reaction product is substantially free of sugars.

2. The process of claim 1 including the step of concentrating the hydrolyzate prior to reaction to a solids content of 40–70 percent.

3. The process of claim 2 wherein the soluble salt is $Na_2SO_3$.

References Cited

UNITED STATES PATENTS

| 2,823,120 | 2/1958 | Parrett | 162—83 |
| 3,262,839 | 7/1966 | Lüthgens | 162—83 |
| 3,231,559 | 1/1966 | Wheeler et al. | 260—209 |

DONALD E. CZAJA, Primary Examiner

R. W. GRIFFIN, Assistant Examiner

U.S. Cl. X.R.

106—92

UNITED STATES PATENT OFFICE
CERTIFICATE OF CORRECTION

Patent No. 3,530,112                     Dated September 22, 1970

Inventor(s) John Charles Steinberg et al.

It is certified that error appears in the above-identified patent and that said Letters Patent are hereby corrected as shown below:

Column 4, line 49, insert the following references:

| | | | |
|---|---|---|---|
| 1,105,607 | 8/1914 | Benjamin | 127-36 |
| 2,103,639 | 12/1937 | Richter | 260-232 |
| 2,767,108 | 10/1956 | Fetzer | 127-36 |
| 2,860,060 | 11/1958 | Benedict, et al. | 106-90 |
| 2,906,659 | 9/1959 | Dorland, et al. | 162-83 |
| 2,963,395 | 12/1960 | Back, et al. | 162-83 |

Signed and sealed this 15th day of December 1970.

(SEAL)
Attest:

EDWARD M. FLETCHER, JR.           WILLIAM E. SCHUYLER, JR.
Attesting Officer                  Commissioner of Patents